United States Patent [19]
Maas

[11] Patent Number: 5,332,304
[45] Date of Patent: Jul. 26, 1994

[54] ABS HYDRAULIC CIRCUIT WITH A VARIABLY OPEN INLET VALVE

[75] Inventor: Joachim Maas, Bad Vilbel, Fed. Rep. of Germany

[73] Assignee: Alfred Teves GmbH, Fed. Rep. of Germany

[21] Appl. No.: 976,985

[22] PCT Filed: May 14, 1992

[86] PCT No.: PCT/EP92/01065

§ 371 Date: Feb. 1, 1993

§ 102(e) Date: Feb. 1, 1993

[87] PCT Pub. No.: WO92/22451

PCT Pub. Date: Dec. 23, 1992

[30] Foreign Application Priority Data

Jun. 19, 1991 [DE] Fed. Rep. of Germany ....... 4118951

[51] Int. Cl.⁵ ................. B60T 8/32; B60T 8/48; B60T 8/36
[52] U.S. Cl. .................. 303/116.2; 303/61; 303/119.2; 137/627.5
[58] Field of Search ................. 303/10-11, 303/113.1, 113.2, 115.2, 116.1, 116.2, 119.1, 119.2, 84.2, 901, 61, 66, 67; 137/627.5

[56] References Cited

U.S. PATENT DOCUMENTS

| | | | |
|---|---|---|---|
| 4,068,904 | 1/1978 | Blomberg et al. | 303/115.2 |
| 4,892,362 | 1/1990 | Takata | 303/115.4 |
| 4,940,295 | 7/1990 | Adachi et al. | 303/117.1 |

FOREIGN PATENT DOCUMENTS

| | | |
|---|---|---|
| 0303261 | 2/1989 | European Pat. Off. |
| 0369412 | 5/1990 | European Pat. Off. |
| 2751150 | 5/1979 | Fed. Rep. of Germany |
| 3542689 | 6/1987 | Fed. Rep. of Germany |
| 3644304 | 7/1987 | Fed. Rep. of Germany |
| 4016749 | 11/1991 | Fed. Rep. of Germany ... 303/119.2 |

Primary Examiner—Douglas C. Butler
Assistant Examiner—Josie A. Ballato

[57] ABSTRACT

The present invention relates to a hydraulic brake system with anti-lock control, including a main pressure line leading from a master cylinder to at least one wheel brake and into which a normally open inlet valve is inserted. A pressure fluid return delivery line is connected to an outlet valve and accommodates a pressure fluid accumulator. Connected downstream of the pressure fluid accumulator, an auxiliary pressure pump takes pressure fluid from the pressure fluid accumulator and delivers the fluid via an auxiliary pressure line to the wheel brake. The auxiliary pressure line is connected to the pressure side of the auxiliary pressure pump and establishes a permanent direct hydraulic connection to the wheel brake so that the auxiliary pressure pump is adapted to be isolated from the master cylinder by the inlet valve. A low-noise brake system is accomplished thereby which permits a reactionless positioning of the brake pedal without complicated controls.

23 Claims, 1 Drawing Sheet

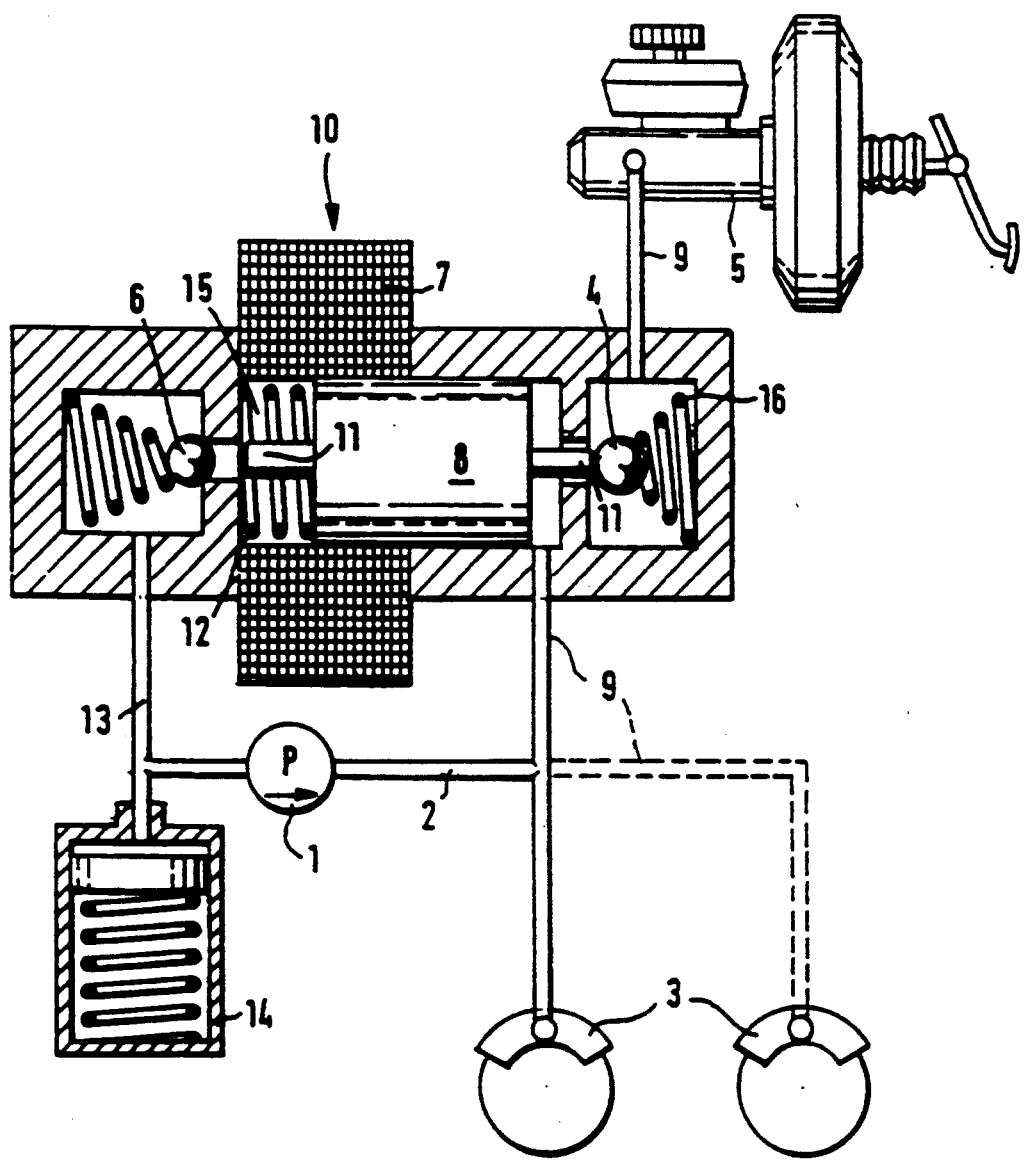

ABS HYDRAULIC CIRCUIT WITH A VARIABLY OPEN INLET VALVE

BACKGROUND

The present invention relates to a hydraulic brake system with anti-lock control, in particular for automotive vehicles.

A brake system is known already from the technical leaflet of Robert Bosch GmbH "Pkw-Bremsanlagen" (passenger vehicle brake systems), first edition, page 17, picture 36. In this brake system the modulated braking pressure has a reactive effect on the brake pedal during the anti-lock control, since the auxiliary-pressure pump is directly connected to the tandem master cylinder. Due to this design of circuit configuration the brake system described above does not perform an anti-lock control operation with the given means without pedal pulsation and without valve switch noises caused by the digital control of the inlet and outlet valve designed as a three-way/three-position directional control valve combination.

SUMMARY OF THE INVENTION

Therefore, it is an object of the present invention to avoid the shortcomings described hereinabove in respect of the state of the art in order to attain a low-cost and noise-minimized brake system by using simple means while maximum reliability in function is maintained. The brake system of the present invention allows a reaction-free positioning of the brake pedal during the braking pressure modulation without taking special measures on the master cylinder.

This object is achieved according to the present invention wherein the auxiliary pressure line connected to the pressure side of an auxiliary pressure pump constitutes a permanent direct hydraulic connection to a wheel brake while bypassing the inlet valve, the permanent hydraulic connection established between the auxiliary pressure pump and the wheel brake being adapted to be isolated from the master cylinder by the inlet valve.

The measures disclosed afford expedient embodiments of the present invention which will be described and explained in more detail hereinbelow with respect to further features and advantages of the invention by way of the accompanying drawing.

DESCRIPTION OF THE DRAWING

FIG. 1 shows a principal circuit configuration of an anti-lock brake system as well as a longitudinal cross-sectional view of an expedient structural embodiment of the valve assembly.

DETAILED DESCRIPTION

A main pressure line 9 connects a master cylinder 5 with at least one wheel brake 3 as long as an inlet valve 4 inserted into the main pressure line 9 and designed as a non-return valve persists in its normal position allowing pressure fluid passage. The normal position of the inlet valve 4 is determined by an electromagnet 10 which is normally de-energized. Electromagnet 10 has a magnet armature 8 which is provided with a tappet 11 on either frontal end and which is held in its normal position by a compression spring 12 which urges the armature in the direction of the inlet valve 4. In the disclosed embodiment, inlet valve 4 is designed as a spherical seat valve. Thus the right-hand tappet 11 in the drawing keeps the inlet valve 4 open in opposition to the effect of a conical spiral spring 16 abutting the inlet valve. Arranged diametrically relative to the inlet valve 4 on the left side of the magnet armature 8 is the outlet valve 6 which is closed in the release position of the brake according to the drawing. Said outlet valve 6 is designed as a spherical non-return valve which acts to close in the direction of the magnet armature 8. In the opening direction of the outlet valve 6, a return delivery line 13 succeeds the suction side of an auxiliary pressure pump 1 and accommodates a pressure fluid accumulator 14 in a branch line. An auxiliary pressure line 2 arranged on the pressure side of the auxiliary pressure pump 1 terminates into the main pressure line 9 which is disposed downstream of the inlet valve 4 and leads directly to the wheel brake 3.

Operation

In the position of brake release or the normal braking position activated by pedal force according to the drawing, the compression spring 12 retains the magnet armature 8 in the position in which the inlet valve 4 is mechanically opened, thereby ensuring an uninhibited pressure fluid connection between the master cylinder 5 and the wheel brake 3. This permits a pressure fluid compensation towards the brake fluid compensating reservoir installed on the master cylinder 5 in the position of brake release, on the one hand, while in case of need, braking pressure proportional to pedal force can be built up in the wheel brake 3 at any time, on the other hand.

When the frictional engagement between road surface and vehicle wheel is exceeded, anti-lock control will commence in dependence on the slip threshold. Consequently, for the purpose of filtering disturbance variables, the braking pressure is kept constant in the beginning by virtue of a brake slip controlling and regulating electronics not illustrated in the drawing, to which end the auxiliary pressure pump 1 and the magnet coil 7 are energized. The magnet armature 8 moves in opposition to the effect of the compression spring 12 into a position relieving the inlet valve 4 from load. As a result, the inlet valve 4 can isolate the pedal-operated master cylinder 5 from the connected wheel brake 3. Simultaneously, no pressure development can take place in the wheel brake 3 despite the auxiliary pressure pump 1 being activated, since no fluid volume is available due to the closed outlet valve 6 and due to the unpressurized fluid accumulator 14. Consequently, the pressure ratio in the wheel brake 3 remains constant at first.

To initiate the phase of pressure reduction in the overbraked vehicle wheel, another continuous current variation is effected in the magnet coil 7 in order to move the magnet armature 8 still somewhat farther to the left in opposition to the effect of the compression spring 12. While the inlet valve 4 continues to keep the master cylinder 5 isolated from the wheel brake 3 due to the conical spiral spring 16 and under the effect of the pressure proportional to pedal force, the left tappet 11 of the magnet armature 8 reaches the outlet valve 6 and opens it. Thus the pressure fluid volume disposed in the wheel brake 3 for the purpose of pressure reduction flows via the main pressure line 9 disposed downstream of the three-way valve combination, via the magnet armature chamber 15 and via the open outlet valve 6 to the pressure fluid accumulator 14. The pressure fluid accumulator 14 is automatically preloaded by that pressure fluid volume of the necessary pressure relief in the wheel brake 3 which corresponds to the brake application that is uncritical, that means stable in respect of driving. Since the inlet valve 4 in the capacity of a shut-off valve remains closed during the entire phase of the pressure remaining constant and the entire phase of pressure reduction, the brake pedal remains motionless in the position it adopted in the beginning of braking pressure control so that pedal pulsations are prevented to occur which are often sensed as irritating.

In case braking pressure is to develop again after the wheel rotational behavior has stabilized, alleviation of the armature current causes the magnet armature 8 to continuously displace to the right again under the effect of the compression spring 12 so far until both the outlet valve 6 and the inlet valve 4 are closed pressure-fluid tightly. Hence the pressure in the wheel brake 3 can be increased again by the preloaded pressure fluid volume of the pressure fluid accumulator 14 by virtue of the auxiliary pressure pump 1.

Since the braking pressure modulation is effected by an analog control instead of a digital control of the magnet current intensity, defined noise-minimizing valve-opening and valve-closing speeds, respectively, can be achieved which among others are the precondition for an individual control of the desired pressure-increasing and pressure-decreasing gradients.

The brake system according to the drawing shows merely one braking pressure control circuit for the sake of clarity of the mode of function. The extension to dual-circuit and multiple-circuit brake system, e.g. in front-axle and rear-axle brake circuit split-up or in diagonal split-up, is identical in the basic design compared to the embodiment, however, each control circuit being furnished with an electromagnetically controlled three-way valve on its own in connection with the inventive circuit configuration.

I claim:

1. A hydraulic brake system with anti-lock control, in particular for automotive vehicles, comprising:
   a main pressure line which leads from a master cylinder to at least one wheel brake and into which an inlet valve having a variable open position is inserted that is normally open;
   an outlet valve coupled with said main pressure line, said outlet valve being closed in its normal position to which a pressure fluid return delivery line is connected;
   a pressure fluid accumulator being connected to the pressure fluid return delivery line; and
   an auxiliary pressure pump connected downstream of the pressure fluid accumulator and taking pressure fluid from the pressure fluid accumulator and delivering it via an auxiliary pressure line to the wheel brake, said auxiliary pressure line being connected to the pressure side of the auxiliary pressure pump constituting a permanent direct hydraulic connection to the wheel brake, while the pressure side of the auxiliary pump is adapted to be shut off in relation to the master cylinder by the inlet valve.

2. A hydraulic brake system with anti-lock control as claimed in claim 1, wherein said inlet and outlet valves are acted upon by a magnet coil, said magnet coil causing said valves to open or close by virtue of an electric current within said coil, said current being variable such that said valves have an infinitely variable position ranging from a fully closed position to a fully open position.

3. A hydraulic brake system with anti-lock control as claimed in claim 1, wherein said inlet and outlet valves include spherical seat valves.

4. A hydraulic brake system with anti-lock control as claimed in claim 1, including a magnet armature having end surfaces controlled by a magnet coil interposed between the inlet and outlet valves, said armature end surfaces being movable into abutment with the inlet or outlet valves.

5. An anti-lock brake system as claimed in claim 1, wherein the inlet valve closes in the direction of the wheel brake and in the direction of the auxiliary pressure line, and the outlet valve is a non-return valve that opens in the direction of the return delivery line.

6. A hydraulic brake system with anti-lock control for controlling the brake system during a lock-up condition that includes an undesirable frictional engagement between a road surface and a vehicle wheel, comprising:
   a master cylinder interconnected through a flow control valve to a wheel brake; and
   an auxiliary pressure means connected to said wheel brake, said flow control valve including
   a normally open inlet valve having a variable open position to permit fluid communication between said master cylinder and said wheel brake, said inlet valve being adapted to close when lock-up occurs thereby isolating said master cylinder from said wheel brake; and
   a normally closed outlet valve for controlling flow from said wheel brake to said auxiliary pressure means; said outlet valve opening to allow auxiliary pressure to communicate with said wheel brake during lock-up.

7. The hydraulic brake system with anti-lock control of claim 6, wherein said flow control valve includes an electromagnet for controlling said inlet and outlet valves.

8. The hydraulic brake system with anti-lock control of claim 6, wherein said inlet and outlet valves include respective check valves biased to a normally closed position by a biasing means to prevent fluid communication through said check valves, and said flow control valve includes an electromagnet for controlling said inlet and outlet valves, said electromagnet having an armature with opposed ends adapted to engage said respective check valves to allow fluid communication through said respective valves.

9. The hydraulic brake system with anti-lock control of claim 6, wherein said outlet valve is interconnected between said master cylinder and the upstream side of said auxiliary pressure means and said inlet valve is interconnected between said master cylinder and said wheel brake.

10. The hydraulic brake system with anti-lock control of claim 6, wherein said auxiliary pressure means includes a pressure fluid accumulator and an auxiliary pump directly connected to said wheel brake.

11. The hydraulic brake system with anti-lock control of claim 6, wherein said auxiliary pressure means includes a pressure fluid accumulator and an auxiliary pump directly connected to said wheel brake, said outlet valve is connected upstream of said auxiliary pressure means, said inlet and outlet valves cooperate to define a fluid communication loop between said auxiliary pressure means and said wheel brake to permit pressure fluctuation at said wheel brake without communicating said pressure fluctuations to said master cylinder.

12. The hydraulic brake system with anti-lock control of claim 6, wherein said outlet valve is connected upstream of said auxiliary pressure means, said inlet and outlet valves cooperate to define a fluid communication loop between said auxiliary pressure means and said wheel brake to permit pressure fluctuation at said wheel brake without communicating said pressure fluctuations to said master cylinder.

13. The hydraulic brake system with anti-lock control of claim 6, wherein said flow control valve includes an electromagnet for controlling said inlet and outlet valves, said electromagnet causing said valves to open or close by virtue of an electric current within said electromagnet, said current being variable such that said inlet and outlet valves have infinitely variable positions ranging from a fully closed position to a fully open position.

14. The hydraulic brake system with anti-lock control of claim 6, wherein said inlet valve closes in the direction of said wheel brake and in the direction of said auxiliary pressure means and said outlet valve is a non-return valve opening in the direction of said auxiliary pressure means.

15. A hydraulic brake system with anti-lock control for controlling the brake system during a lock-up condition that includes an undesirable frictional engagement between a road surface and a vehicle wheel, comprising:
  a master cylinder interconnected through a flow control valve to a wheel brake; and
  an auxiliary pressure means connected to said wheel brake, said flow control valve including a normally open inlet valve having a variable open position to permit fluid communication between said master cylinder and said wheel brake, and a normally closed outlet valve, said inlet and outlet valves cooperating to define a fluid communication loop between said auxiliary pressure means and said wheel brake to permit pressure fluctuation at said wheel brake without communicating said pressure fluctuation to said master cylinder during lock-up.

16. The hydraulic brake system with anti-lock control of claim 15, wherein said flow control valve includes an electromagnet for controlling said inlet and outlet valves.

17. The hydraulic brake system with anti-lock control of claim 15, wherein said inlet and outlet valves include respective check valves biased to a normally closed position by a biasing means to prevent fluid communication through said valves, and said flow control valve includes an electromagnet for controlling said inlet and outlet valves, said electromagnet having an armature with opposed ends adapted to engage said respective check valves to allow fluid communication through said respective valves.

18. The hydraulic brake system with anti-lock control of claim 15, wherein said outlet valve is interconnected between said master cylinder and the upstream side of said auxiliary pressure means, and said inlet valve is interconnected upstream of said outlet valve and between said master cylinder and said wheel brake.

19. The hydraulic brake system with anti-lock control of claim 15, wherein said auxiliary pressure means includes a pressure fluid accumulator and an auxiliary pump directly connected to said wheel brake.

20. The hydraulic brake system with anti-lock control of claim 15, wherein said inlet valve closes in the direction of said wheel brake and in the direction of said auxiliary pressure means and said outlet valve is a non-return valve opening in the direction of said auxiliary pressure means.

21. A hydraulic brake system with anti-lock control, in particular, for automotive vehicles, comprising:
  a main pressure line which leads from a master cylinder to at least one wheel brake and into which an inlet valve is inserted that is normally open;
  an outlet valve coupled with said main pressure line, said outlet valve being closed in its normal position to which a pressure fluid return delivery line is connected;
  a pressure fluid accumulator being connected to the pressure fluid return delivery line; and
  an auxiliary pressure pump connected downstream of the pressure fluid accumulator and taking pressure fluid from the pressure fluid accumulator and delivering it via an auxiliary pressure line to the wheel brake, said auxiliary pressure line being connected to the pressure side of the auxiliary pressure pump constituting a permanent direct hydraulic connection to the wheel brake, while the pressure side of the auxiliary pressure pump is adapted to be shut off in relation to the master cylinder by the inlet valve, said inlet valve closing in the direction of the wheel brake and in the direction of the auxiliary pressure line, said outlet valve being a non-return valve that opens in the direction of the return delivery line.

22. A hydraulic brake system with anti-lock control for controlling the brake system during lock-up, comprising:
  a master cylinder interconnected through a flow control valve to a wheel brake; and
  a auxiliary pressure means connected to said wheel brake, said flow control valve including
  a normally open inlet valve normally permitting fluid communication between said master cylinder and said wheel brake, said inlet valve being adapted to close when lock-up occurs thereby isolating said master cylinder from said wheel brake; and
  a normally closed outlet valve for controlling flow from said wheel brake to said auxiliary pressure means, said outlet valve opening to allow auxiliary pressure to communicate with said wheel brake during lock-up, said inlet valve closing in the direction of said wheel brake and in the direction of said auxiliary pressure means and said outlet valve being a non-return valve opening in the direction of said auxiliary pressure means.

23. A hydraulic brake system with anti-lock control for controlling the brake system during a lock-up condition that includes an undesirable frictional engagement between a road surface and a vehicle wheel, comprising:
  a master cylinder interconnected through a flow control valve to a wheel brake; and
  an auxiliary pressure means connected to said wheel brake, said flow control valve including a normally open inlet valve normally permitting fluid communication between said master cylinder and said wheel brake, and a normally closed outlet valve, said inlet and outlet valves cooperating to define a fluid communication loop between said auxiliary pressure means and said wheel brake to permit pressure fluctuation at said wheel brake without communicating said pressure fluctuation to said master cylinder during lock-up, said inlet valve closing in the direction of said wheel brake and in the direction of said auxiliary pressure means and said outlet valve being a non-return valve opening in the direction of said auxiliary pressure means.

* * * * *